(12) United States Patent  
Hayes et al.

(10) Patent No.: US 12,377,871 B2  
(45) Date of Patent: Aug. 5, 2025

(54) SCHEDULING STATE TRANSITIONS IN AN AUTONOMOUS VEHICLE

(71) Applicant: GHOST AUTONOMY INC., Mountain View, CA (US)

(72) Inventors: John Hayes, Mountain View, CA (US); Volkmar Uhlig, Cupertino, CA (US)

(73) Assignee: Applied Intuition, Inc., Mountain View, CA (US)

( * ) Notice: Subject to any disclaimer, the term of this patent is extended or adjusted under 35 U.S.C. 154(b) by 172 days.

(21) Appl. No.: 17/708,588

(22) Filed: Mar. 30, 2022

(65) Prior Publication Data

US 2022/0315041 A1 Oct. 6, 2022

Related U.S. Application Data

(60) Provisional application No. 63/167,898, filed on Mar. 30, 2021.

(51) Int. Cl.
*B60W 60/00* (2020.01)
*G06N 20/00* (2019.01)

(52) U.S. Cl.
CPC .......... *B60W 60/001* (2020.02); *G06N 20/00* (2019.01); *B60W 2420/403* (2013.01)

(58) Field of Classification Search
CPC .......... B60W 60/001; B60W 2420/403; G06N 20/00
See application file for complete search history.

(56) References Cited

U.S. PATENT DOCUMENTS

| | | | |
|---|---|---|---|
| 11,084,504 B2 * | 8/2021 | Wray | B60W 30/18154 |
| 11,132,211 B1 * | 9/2021 | Tang | B60W 60/00 |
| 2018/0173237 A1 * | 6/2018 | Reiley | G05D 1/0061 |
| 2020/0387162 A1 * | 12/2020 | Kobayashi | G05D 1/027 |
| 2021/0191407 A1 * | 6/2021 | Benisch | G05D 1/0214 |
| 2022/0276618 A1 * | 9/2022 | Aroskar | G06F 16/29 |

* cited by examiner

*Primary Examiner* — Aniss Chad
*Assistant Examiner* — Stephanie T Su
(74) *Attorney, Agent, or Firm* — McDermott Will & Emery LLP

(57) ABSTRACT

Scheduling state transitions in an autonomous vehicle, including: detecting a transition signal for transitioning from a first state associated with a first machine learning model to a second state associated with a second machine learning model; determining whether a precondition for generating output by the second machine learning model has been satisfied; and delaying, in response for the precondition not being satisfied, a transition from the first state to the second state.

20 Claims, 13 Drawing Sheets

SCHEDULING STATE TRANSITIONS IN AN AUTONOMOUS VEHICLE

CROSS-REFERENCE TO RELATED APPLICATION

This is a non-provisional application for patent entitled to a filing date and claiming the benefit of earlier-filed U.S. Provisional Patent Application No. 63/167,898, filed Mar. 30, 2021, herein incorporated by reference in its entirety.

BACKGROUND

Field of the Invention

The field of the invention is data processing, or, more specifically, methods, apparatus, autonomous vehicles, and products for scheduling state transitions in an autonomous vehicle.

Description of Related Art

Autonomous vehicles may use machine learning models to generate control operations or perform other functions of the autonomous vehicle. Some machine learning models have preconditions that must be satisfied before providing a usable output.

SUMMARY

Scheduling state transitions in an autonomous vehicle, including: detecting a transition signal for transitioning from a first state associated with a first machine learning model to a second state associated with a second machine learning model; determining whether a precondition for generating output by the second machine learning model has been satisfied; and delaying, in response for the precondition not being satisfied, a transition from the first state to the second state.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
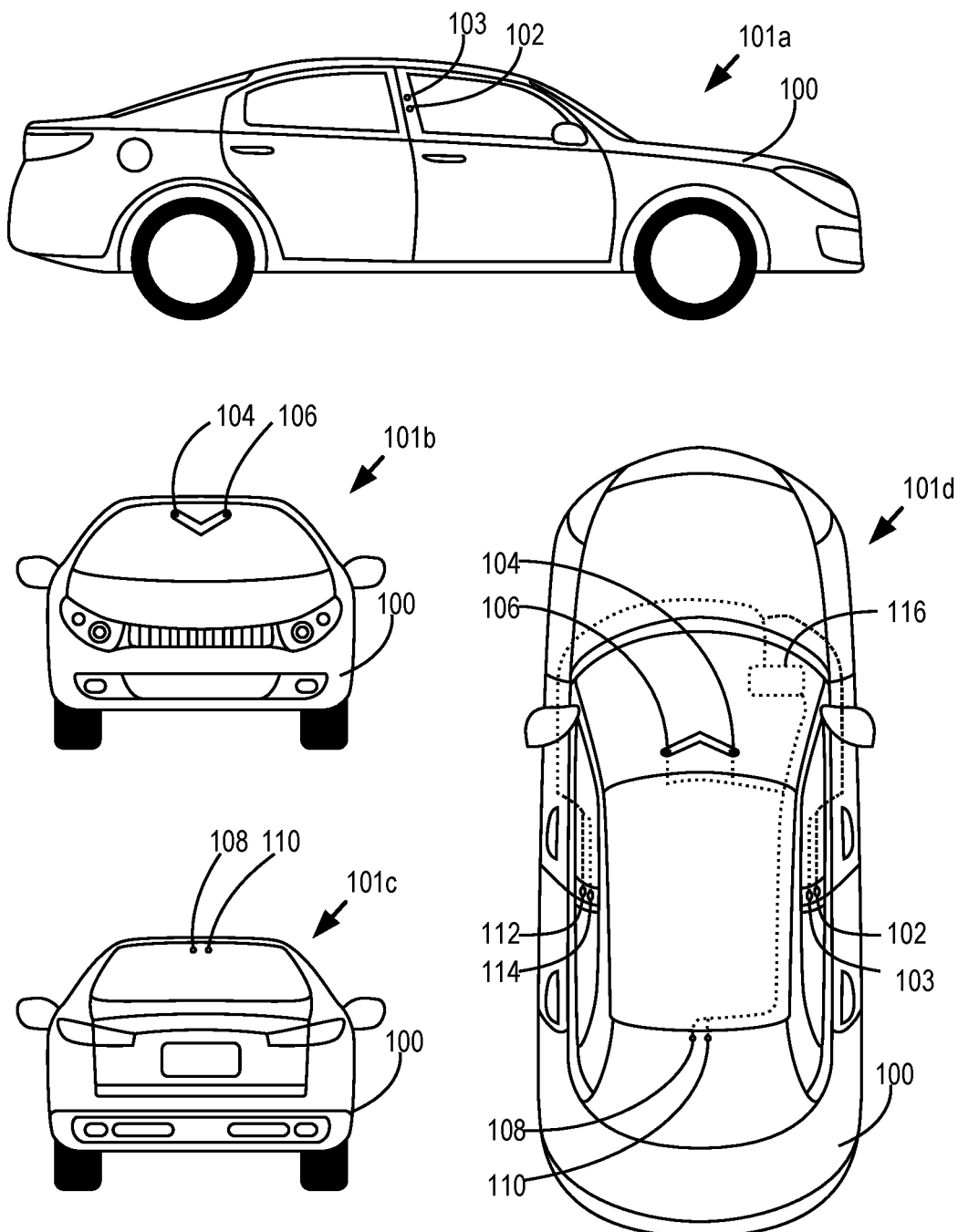
FIG. 1 shows example views of an autonomous vehicle for scheduling state transitions in an autonomous vehicle.

Scheduling state transitions in an autonomous vehicle may be implemented in an autonomous vehicle. Accordingly, FIG. 1 shows multiple views of an autonomous vehicle 100 configured for scheduling state transitions in an autonomous vehicle according to embodiments of the present invention. Right side view 101*a* shows a right side of the autonomous vehicle 100. Shown in the right side view 101*a* are cameras 102 and 103, configured to capture image data, video data, and/or audio data of the environmental state of the autonomous vehicle 100 from the perspective of the right side of the car. Front view 101*b* shows a front side of the autonomous vehicle 100. Shown in the front view 101*b* are cameras 104 and 106, configured to capture image data, video data, and/or audio data of the environmental state of the autonomous vehicle 100 from the perspective of the front of the car. Rear view 101*c* shows a rear side of the autonomous vehicle 100. Shown in the rear view 101*c* are cameras 108 and 110, configured to capture image data, video data, and/or audio data of the environmental state of the autonomous vehicle 100 from the perspective of the rear of the car. Top view 101*d* shows a rear side of the autonomous vehicle 100. Shown in the top view 101*d* are cameras 102-110. Also shown are cameras 112 and 114, configured to capture image data, video data, and/or audio data of the environmental state of the autonomous vehicle 100 from the perspective of the left side of the car.

Further shown in the top view 101*d* is an automation computing system 116. The automation computing system 116 comprises one or more computing devices configured to control one or more autonomous operations (e.g., autonomous driving operations) of the autonomous vehicle 100. For example, the automation computing system 116 may be configured to process sensor data (e.g., data from the cameras 102-114 and potentially other sensors), operational data (e.g., a speed, acceleration, gear, orientation, turning direction), and other data to determine a operational state and/or operational history of the autonomous vehicle. The automation computing system 116 may then determine one or more operational commands for the autonomous vehicle (e.g., a change in speed or acceleration, a change in brake application, a change in gear, a change in turning or orientation, etc.). The automation computing system 116 may also capture and store sensor data. Operational data of the autonomous vehicle may also be stored in association with corresponding sensor data, thereby indicating the operational data of the autonomous vehicle 100 at the time the sensor data was captured.

Although the autonomous vehicle 100 if FIG. 1 is shown as car, it is understood that autonomous vehicles 100 configured for scheduling state transitions in an autonomous vehicle may also include other vehicles, including motorcycles, planes, helicopters, unmanned aerial vehicles (UAVs, e.g., drones), or other vehicles as can be appreciated. Moreover, it is understood that additional cameras or other external sensors may also be included in the autonomous vehicle 100.

Scheduling state transitions in an autonomous vehicle in accordance with the present invention is generally implemented with computers, that is, with automated computing machinery. For further explanation, therefore, FIG. 2 sets forth a block diagram of automated computing machinery comprising an exemplary automation computing system 116 configured for scheduling state transitions in an autonomous vehicle according to embodiments of the present invention. The automation computing system 116 of FIG. 2 includes at least one computer Central Processing Unit (CPU) package 204 as well as random access memory 206 (RAM') which is connected through a high speed memory bus 208 and bus adapter 210 to CPU packages 204 via a front side bus 211 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service will then receive data from the secondary processing unit. A redundant processing unit may then be selected and have allocated the given process to ensure that two or more processing units are allocated the given process for redundancy and increased reliability.

The CPU packages 204 are communicatively coupled to one or more sensors 212. The sensors 212 are configured to capture sensor data describing the operational and environmental conditions of an autonomous vehicle. For example, the sensors 212 may include cameras (e.g., the cameras 102-114 of FIG. 1), accelerometers, Global Positioning System (GPS) radios, Lidar sensors, or other sensors as can be appreciated. As described herein, cameras may include a stolid state sensor 212 with a solid state shutter capable of measuring photons or a time of flight of photons. For example, a camera may be configured to capture or measure photons captured via the shutter for encoding as images and/or video data. As another example, a camera may emit photons and measure the time of flight of the emitted photons. Cameras may also include event cameras configured to measure changes in light and/or motion of light.

Although the sensors 212 are shown as being external to the automation computing system 116, it is understood that one or more of the sensors 212 may reside as a component of the automation computing system 116 (e.g., on the same board, within the same housing or chassis). The sensors 212 may be communicatively coupled with the CPU packages 204 via a switched fabric 213. The switched fabric 213 comprises a communications topology through which the CPU packages 204 and sensors 212 are coupled via a plurality of switching mechanisms (e.g., latches, switches, crossbar switches, field programmable gate arrays (FPGAs), etc.). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established.

The CPU packages 204 and sensors 212 are configured to receive power from one or more power supplies 215. The power supplies 215 may comprise an extension of a power system of the autonomous vehicle 100 or an independent power source (e.g., a battery). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 212.

Stored in RAM 206 is an automation module 220. The automation module 220 may be configured to process sensor data from the sensors 212 to determine a driving decision for the autonomous vehicle. The driving decision comprises one or more operational commands for an autonomous vehicle 100 to affect the movement, direction, or other function of the autonomous vehicle 100, thereby facilitating autonomous driving or operation of the vehicle. Such operational commands may include a change in the speed of the autonomous vehicle 100, a change in steering direction, a change in gear, or other command as can be appreciated. For example, the automation module 220 may provide sensor data and/or processed sensor data as one or more inputs to a trained machine learning model (e.g., a trained neural network) to determine the one or more operational commands. The operational commands may then be communicated to autonomous vehicle control systems 223 via a vehicle interface 222.

In some embodiments, the automation module 220 may be configured to determine an exit path for an autonomous vehicle 100 in motion. The exit path includes one or more operational commands that, if executed, are determined and/or predicted to bring the autonomous vehicle 100 safely to a stop (e.g., without collision with an object, without violating one or more safety rules). The automation module 220 may determine a both a driving decision and an exit path at a predefined interval. The automation module 220 may then send the driving decision and the exit path to the autonomous vehicle control systems 223. The autonomous vehicle control systems 223 may be configured to execute the driving decision unless an error state has been reached. If an error decision has been reached, therefore indicating a possible error in functionality of the automation computing system 116), the autonomous vehicle control systems 223 may then execute a last received exit path in order to bring the autonomous vehicle 100 safely to a stop. Thus, the autonomous vehicle control systems 223 are configured to receive both a driving decision and exit path at predefined intervals, and execute the exit path in response to an error.

The autonomous vehicle control systems 223 are configured to affect the movement and operation of the autonomous vehicle 100. For example, the autonomous vehicle control systems 223 may activate (e.g., apply one or more control signals) to actuators or other components to turn or otherwise change the direction of the autonomous vehicle 100, accelerate or decelerate the autonomous vehicle 100, change a gear of the autonomous vehicle 100, or otherwise affect the movement and operation of the autonomous vehicle 100.

Further stored in RAM 206 is a data collection module 224 configured to process and/or store sensor data received from the one or more sensors 212. For example, the data collection module 224 may store the sensor data as captured by the one or more sensors 212, or processed sensor 212 data (e.g., sensor 212 data having object recognition, compression, depth filtering, or other processes applied). Such processing may be performed by the data collection module 224 in real-time or in substantially real-time as the sensor data is captured by the one or more sensors 212. The processed sensor data may then be used by other functions or modules. For example, the automation module 220 may use processed sensor data as input to determine one or more operational commands. The data collection module 224 may store the sensor data in data storage 218.

Also stored in RAM 206 is a data processing module 226. The data processing module 226 is configured to perform one or more processes on stored sensor data (e.g., stored in data storage 218 by the data collection module 218) prior to upload to a execution environment 227. Such operations can include filtering, compression, encoding, decoding, or other operations as can be appreciated. The data processing module 226 may then communicate the processed and stored sensor data to the execution environment 227.

Further stored in RAM 206 is a hypervisor 228. The hypervisor 228 is configured to manage the configuration and execution of one or more virtual machines 229. For example, each virtual machine 229 may emulate and/or simulate the operation of a computer. Accordingly, each virtual machine 229 may comprise a guest operating system 216 for the simulated computer. The hypervisor 228 may manage the creation of a virtual machine 229 including installation of the guest operating system 216. The hypervisor 228 may also manage when execution of a virtual machine 229 begins, is suspended, is resumed, or is terminated. The hypervisor 228 may also control access to computational resources (e.g., processing resources, memory resources, device resources) by each of the virtual machines.

Each of the virtual machines 229 may be configured to execute one or more of the automation module 220, the data collection module 224, the data processing module 226, or combinations thereof. Moreover, as is set forth above, each of the virtual machines 229 may comprise its own guest operating system 216. Guest operating systems 216 useful in autonomous vehicles in accordance with some embodiments of the present disclosure include UNIX™, Linux™, Microsoft Windows™, AIX™, IBM's i OS™, and others as will occur to those of skill in the art. For example, the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode. In such an example, the first operating system may be formally verified, secure, and operate in real-time such that data collected from the sensors 212 are processed within a predetermined period of time, and autonomous driving operations are performed within a predetermined period of time, such that data is processed and acted upon essentially in real-time. Continuing with this example, the second operating system may not be formally verified, may be less secure, and may not operate in real-time as the tasks that are carried out (which are described in greater detail below) by the second operating system are not as time-sensitive the tasks (e.g., carrying out self-driving operations) performed by the first operating system.

Readers will appreciate that although the example included in the preceding paragraph relates to an embodiment where the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode, other embodiments are within the scope of the present disclosure. For example, in another embodiment one CPU (or other appropriate entity such as a chip, CPU core, and so on) may be executing the first operating system and a second CPU (or other appropriate entity) may be executing the second operating system, where switching between these two modalities is accomplished through fabric switching, as described in greater detail below. Likewise, in some embodiments, processing resources such as a CPU may be partitioned where a first partition supports the execution of the first operating system and a second partition supports the execution of the second operating system.

The guest operating systems 216 may correspond to a particular operating system modality. An operating system modality is a set of parameters or constraints which a given operating system satisfies, and are not satisfied by operating systems of another modality. For example, a given operating system may be considered a "real-time operating system" in that one or more processes executed by the operating system must be performed according to one or more time constraints. For example, as the automation module 220 must make determinations as to operational commands to facilitate autonomous operation of a vehicle. Accordingly, the automation module 220 must make such determinations within one or more time constraints in order for autonomous operation to be performed in real time. The automation module 220 may then be executed in an operating system (e.g., a guest operating system 216 of a virtual machine 229) corresponding to a "real-time operating system" modality. Conversely, the data processing module 226 may be able to perform its processing of sensor data independent of any time constrains, and may then be executed in an operating system (e.g., a guest operating system 216 of a virtual machine 229) corresponding to a "non-real-time operating system" modality.

As another example, an operating system (e.g., a guest operating system 216 of a virtual machine 229) may comprise a formally verified operating system. A formally verified operating system is an operating system for which the correctness of each function and operation has been verified with respect to a formal specification according to formal proofs. A formally verified operating system and an unverified operating system (e.g., one that has not been formally verified according to these proofs) can be said to operate in different modalities.

Figure 2:
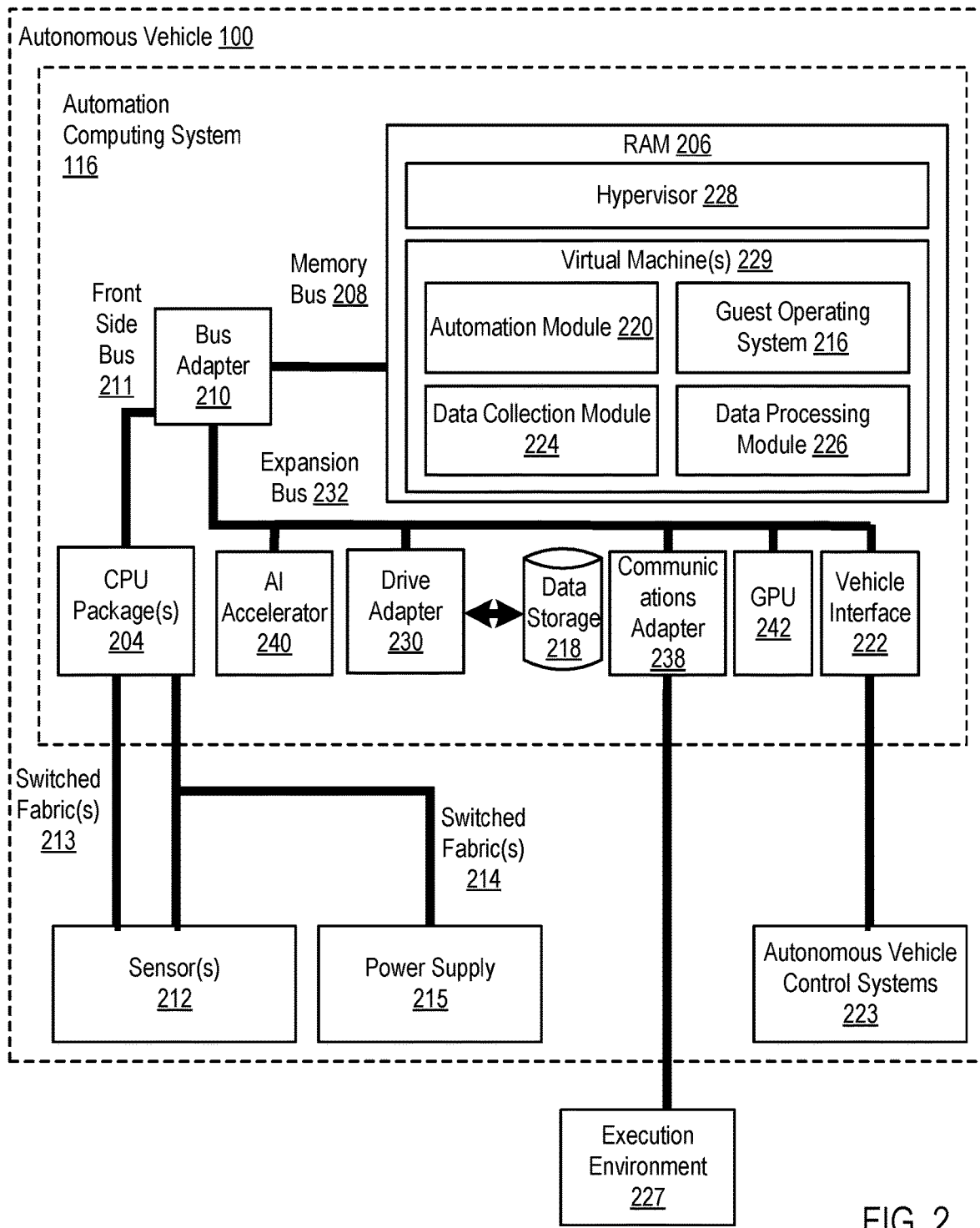
FIG. 2 is block diagram of an autonomous computing system for scheduling state transitions in an autonomous vehicle.

The automation module 220, data collection module 224, data collection module 224, data processing module 226, hypervisor 228, and virtual machine 229 in the example of FIG. 2 are shown in RAM 206, but many components of such software typically are stored in non-volatile memory also, such as, for example, on data storage 218, such as a disk drive. Moreover, any of the automation module 220, data collection module 224, and data processing module 226 may be executed in a virtual machine 229 and facilitated by a guest operating system 216 of that virtual machine 229.

The automation computing system 116 of FIG. 2 includes disk drive adapter 230 coupled through expansion bus 232 and bus adapter 210 to CPU package(s) 204 and other components of the automation computing system 116. Disk drive adapter 230 connects non-volatile data storage to the automation computing system 116 in the form of data storage 218. Disk drive adapters 230 useful in computers configured for scheduling state transitions in an autonomous vehicle according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The exemplary automation computing system 116 of FIG. 2 includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for scheduling state transitions in an autonomous vehicle according to embodiments of the present invention include modems for wired dial-up communications, Ethernet (IEEE 802.3) adapters for wired data communications, 802.11 adapters for wireless data communications, as well as mobile adapters (e.g., cellular communications adapters) for mobile data communications. For example, the automation computing system 116 may communicate with one or more remotely disposed execution environments 227 via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, performance of any of the automation module 220, data collection module 224, data processing module 226, or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, performance of any of the automation module 220, data collection module 224, data processing module 226, or other operations of the automation computing system 116 may be performed at least in part by the GPUs 242.

Figure 3:
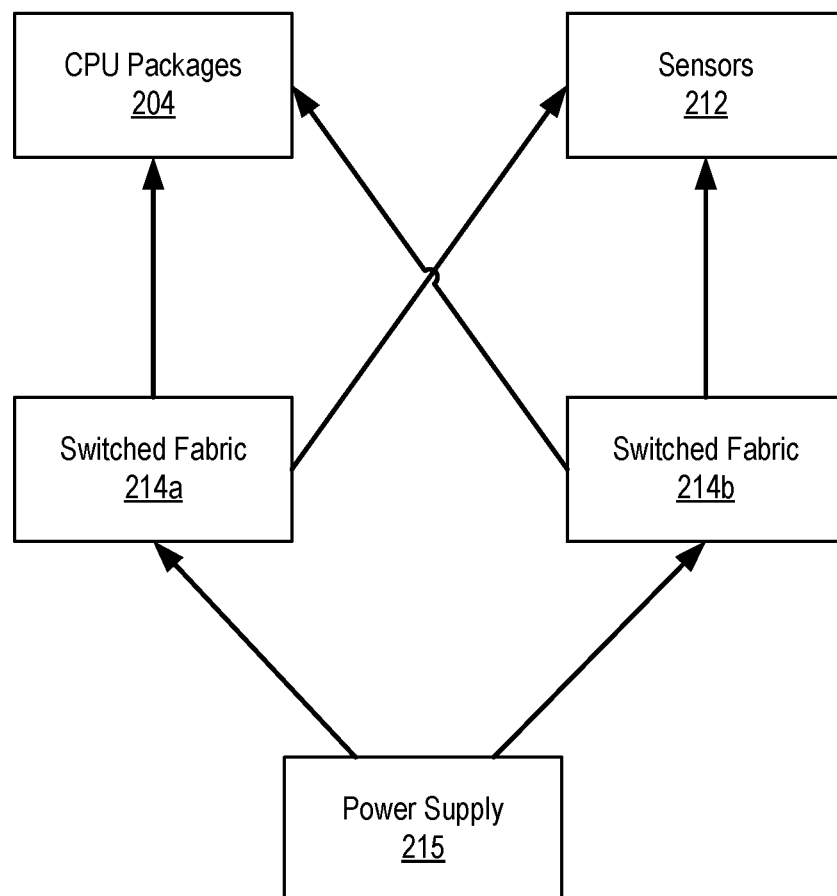
FIG. 3 is a block diagram of a redundant power fabric for scheduling state transitions in an autonomous vehicle.

FIG. 3 shows an example redundant power fabric for scheduling state transitions in an autonomous vehicle. The redundant power fabric provides redundant pathways for power transfer between the power supplies 215, the sensors 212, and the CPU packages 204. In this example, the power supplies 215 are coupled to the sensors 212 and CPU packages via two switched fabrics 214a and 214b. The topology shown in FIG. 3 provides redundant pathways between the power supplies 215, the sensors 212, and the CPU packages 204 such that power can be rerouted through any of multiple pathways in the event of a failure in an active connection pathway. The switched fabrics 214a and 214b may provide power to the sensors 212 using various connections, including Mobile Industry Processor Interface (MIPI), Inter-Integrated Circuit (I2C), Universal Serial Bus (USB), or another connection. The switched fabrics 214a and 214b may also provide power to the CPU packages 204 using various connections, including Peripheral Component Interconnect Express (PCIe), USB, or other connections. Although only two switched fabrics 214a and 214b are shown connecting the power supplies 215 to the sensors 212 and CPU packages 204, it is understood that the approach shown by FIG. 3 can be modified to include additional switched fabrics 214.

Figure 4:
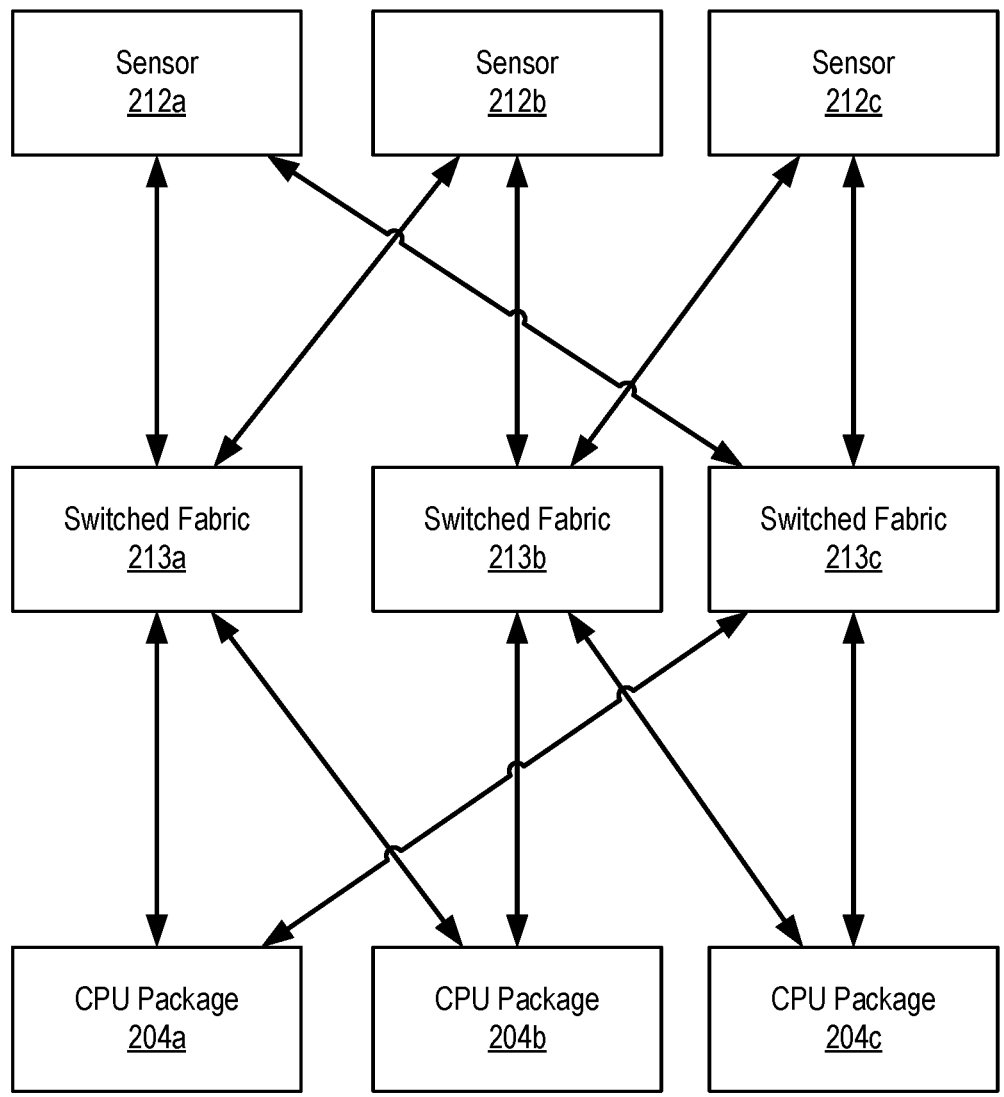
FIG. 4 is a block diagram of a redundant data fabric for scheduling state transitions in an autonomous vehicle.

FIG. 4 is an example redundant data fabric for scheduling state transitions in an autonomous vehicle. The redundant data fabric provides redundant data connection pathways between sensors 212 and CPU packages 204. In this example view, three CPU packages 204a, 204b, and 204c are connected to three sensors 212a, 212b, and 212c via three switched fabrics 213a, 213b, and 213c. Each CPU package 204a, 204b, and 204c is connected to a subset of the switched fabrics 213a, 213b, and 213c. For example, CPU package 204a is connected to switched fabrics 213a and 213c, CPU package 204b is connected to switched fabrics 213a and 213b, and CPU package 204c is connected to switched fabrics 213b and 213c. Each switched fabric 213a, 213b, and 213c is connected to a subset of the sensors 212a, 212b, and 212c. For example, switched fabric 213a is connected to sensors 212a and 212b, switched fabric 213b is connected to sensor 212b and 212c, and switched fabric 213c is connected to sensors 212a and 212c. Under this topology, each CPU package 204a, 204b, and 204c has an available connection path to any sensor 212a, 212b, and 212c. It is understood that the topology of FIG. 4 is exemplary, and that CPU packages, switched fabrics, sensors, or connections between components may be added or removed while maintaining redundancy as can be appreciated by one skilled in the art.

Figure 5:
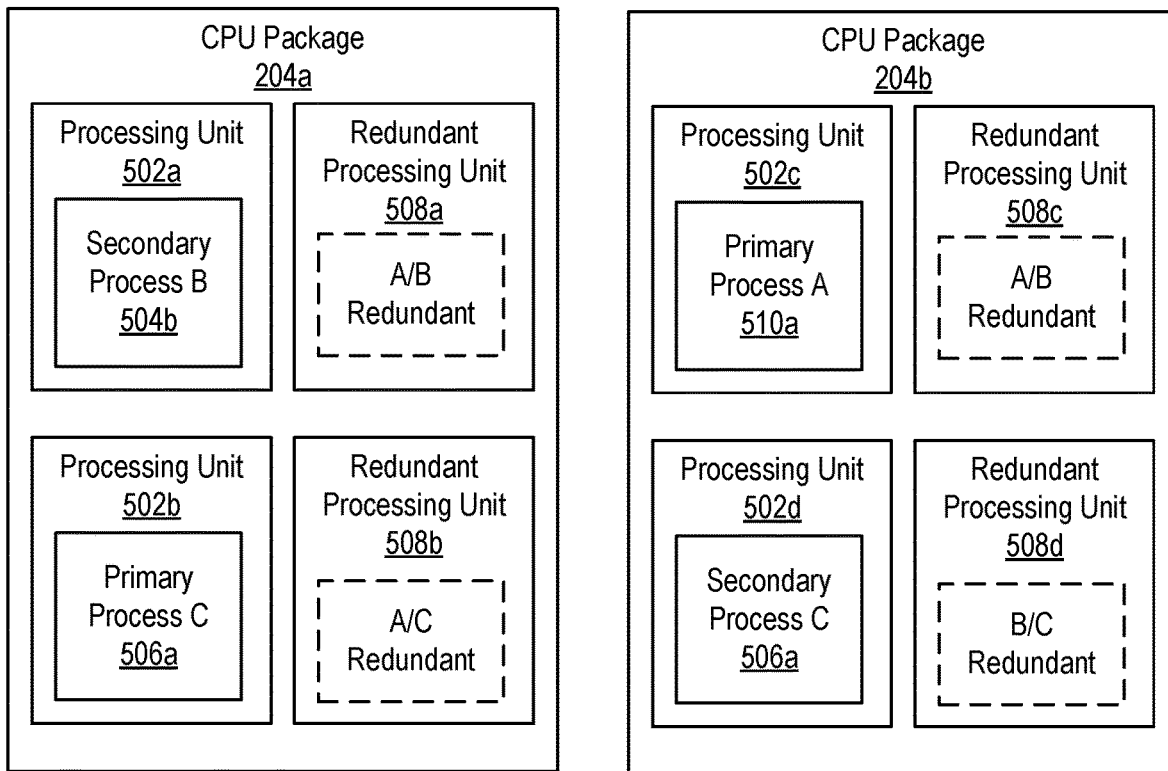
FIG. 5 is an example view of process allocation across CPU packages for scheduling state transitions in an autonomous vehicle.
Figure 5:
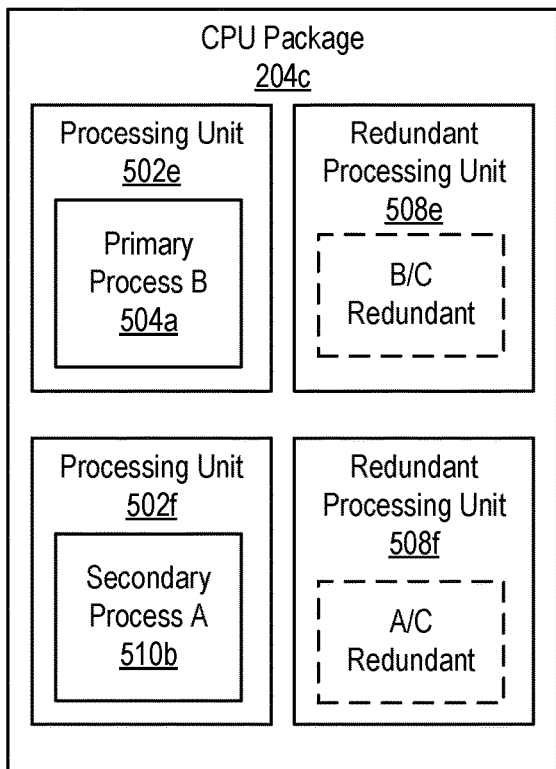

FIG. 5 is an example view of process allocation across CPU packages for scheduling state transitions in an autonomous vehicle. Shown are three CPU packages 204a, 204b, and 204c. Each CPU package 204a includes a processing unit that has been allocated (e.g., by a hypervisor 228 or other process or service) primary execution of a process and another processing unit that has been allocated secondary execution of a process. As set forth herein, primary execution of a process describes an executing instance of a process whose output will be provided to another process or service. Secondary execution of the process describes executing an instance of the process in parallel to the primary execution, but the output may not be output to the other process or service. For example, in CPU package 204a, processing unit 502a has been allocated secondary execution of "process B," denoted as secondary process B 504b, while processing unit 502b has been allocated primary execution of "process C," denoted as primary process C 506a.

CPU package 204a also comprises two redundant processing units that are not actively executing a process A, B, or C, but are instead reserved in case of failure of an active processing unit. Redundant processing unit 508a has been reserved as "A/B redundant," indicating that reserved processing unit 508a may be allocated primary or secondary execution of processes A or B in the event of a failure of a processing unit allocated the primary or secondary execution of these processes. Redundant processing unit 508b has been reserved as "A/C redundant," indicating that reserved processing unit 508b may be allocated primary or secondary execution of processes A or C in the event of a failure of a processing unit allocated the primary or secondary execution of these processes.

CPU package 204b includes processing unit 502c, which has been allocated primary execution of "process A," denoted as primary process A 510a, and processing unit 502d, which has been allocated secondary execution of "process C," denoted as secondary process C 506a. CPU package 204b also includes redundant processing unit 508c, reserved as "A/B redundant," and redundant processing unit 508d, reserved as "B/C redundant." CPU package 204c includes processing unit 502e, which has been allocated primary execution of "process B," denoted as primary process B 504a, and processing unit 502f, which has been allocated secondary execution of "process A," denoted as secondary process A 510b. CPU package 204c also includes redundant processing unit 508e, reserved as "B/C redundant," and redundant processing unit 508f, reserved as "A/C redundant."

As set forth in the example view of FIG. 5, primary and secondary instances processes A, B, and C are each executed in an allocated processing unit. Thus, if a processing unit performing primary execution of a given process fails, the processing unit performing secondary execution may instead provide output of the given process to a receiving process or service. Moreover, the primary and secondary execution of a given process are executed on different CPU packages. Thus, if an entire processing unit fails, execution of each of the processes can continue using one or more processing units handling secondary execution. The redundant processing units 508a-f allow for allocation of primary or secondary execution of a process in the event of processing unit failure. This further prevents errors caused by processing unit failure as parallel primary and secondary execution of a process may be restored. One skilled in the art would understand that the number of CPU packages, processing units, redundant processing units, and processes may be modified according to performance requirements while maintaining redundancy.

Figure 6:
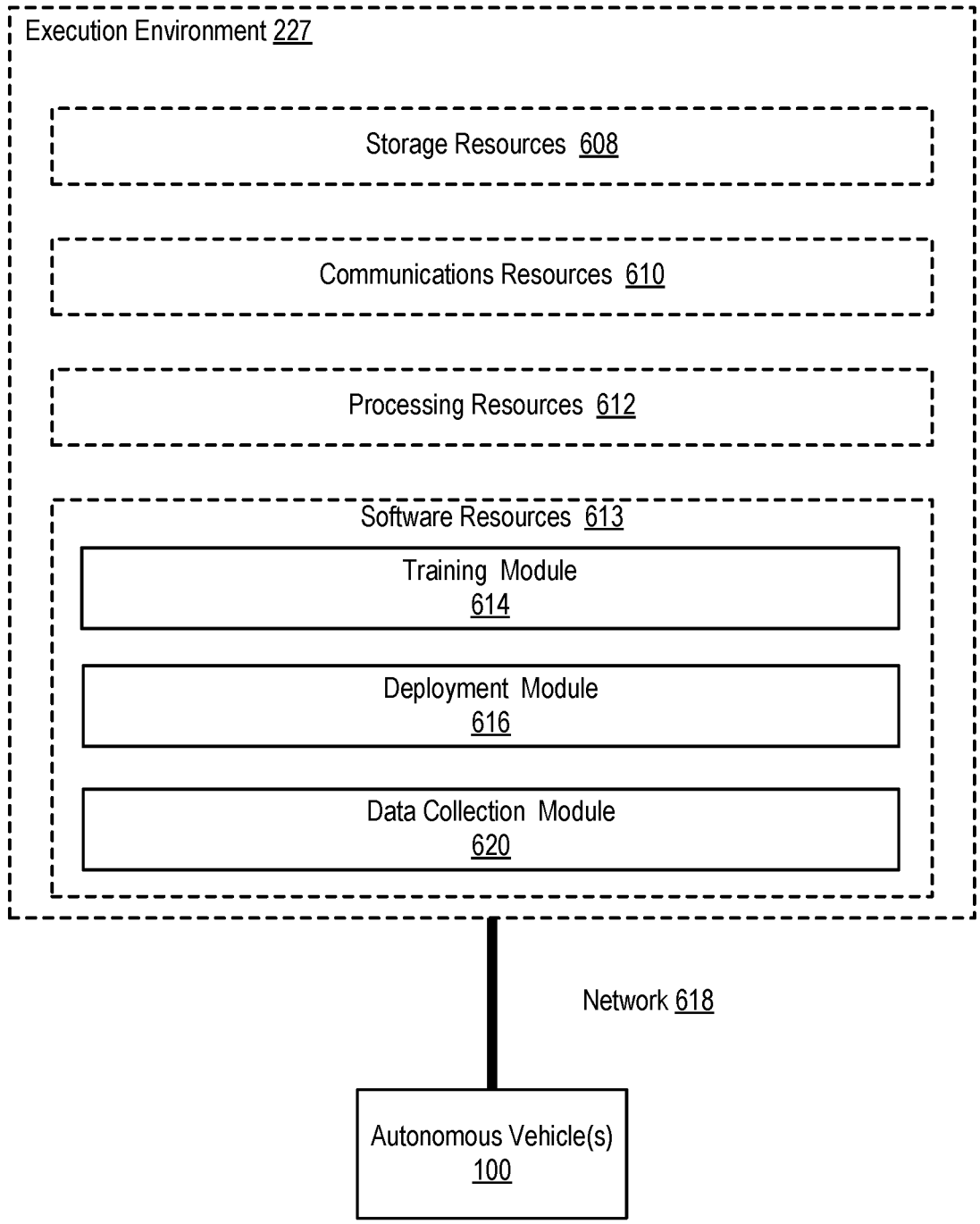
FIG. 6 is an example view of an execution environment for scheduling state transitions in an autonomous vehicle.

For further explanation, FIG. 6 sets forth a diagram of an execution environment 227 accordance with some embodiments of the present disclosure. The execution environment 227 depicted in FIG. 6 may be embodied in a variety of different ways. The execution environment 227 may be provided, for example, by one or more physical or virtual machine components consisting of bare-metal applications, operating systems such as Android, Linux, Real-time Operating systems (RTOS), Automotive RTOS, such as AutoSAR, and others, including combinations thereof. The execution environment 227 may also be provided by cloud computing providers such as Amazon AWS, Microsoft Azure, Google Cloud, and others, including combinations thereof. Alternatively, the execution environment 227 may be embodied as a collection of devices (e.g., servers, storage devices, networking devices) and software resources that are included in a computer or distributed computer or private data center. Readers will appreciate that the execution environment 227 may be constructed in a variety of other ways and may even include resources within one or more autonomous vehicles or resources that communicate with one or more autonomous vehicles.

The execution environment 227 depicted in FIG. 6 may include storage resources 608, which may be embodied in many forms. For example, the storage resources 608 may include flash memory, hard disk drives, nano-RAM, 3D crosspoint non-volatile memory, MRAM, non-volatile phase-change memory ('PCM'), storage class memory ('SCM'), or many others, including combinations of the storage technologies described above. Readers will appreciate that other forms of computer memories and storage devices may be utilized as part of the execution environment 227, including DRAM, SRAM, EEPROM, universal memory, and many others. The storage resources 608 may also be embodied, in embodiments where the execution environment 227 includes resources offered by a cloud provider, as cloud storage resources such as Amazon Elastic Block Storage ('EBS') block storage, Amazon S3 object storage, Amazon Elastic File System (EFS') file storage, Azure Blob Storage, and many others. The example execution environment 227 depicted in FIG. 6 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders, and presented to both the system storing it and the system retrieving it in the same format.

The execution environment 227 depicted in FIG. 6 also includes communications resources 610 that may be useful in facilitating data communications between components within the execution environment 227, as well as data communications between the execution environment 227 and computing devices that are outside of the execution environment 227. Such communications resources may be embodied, for example, as one or more routers, network switches, communications adapters, and many others, including combinations of such devices. The communications resources 610 may be configured to utilize a variety of different protocols and data communication fabrics to facilitate data communications. For example, the communications resources 610 may utilize Internet Protocol (IP') based technologies, fibre channel ('FC') technologies, FC over ethernet ('FCoE') technologies, InfiniBand ('IB') technologies, NVM Express ('NVMe') technologies and NVMe over fabrics ('NVMeoF') technologies, and many others. The communications resources 610 may also be embodied, in embodiments where the execution environment 227 includes resources offered by a cloud provider, as networking tools and resources that enable secure connections to the cloud as well as tools and resources (e.g., network interfaces, routing tables, gateways) to configure networking resources in a virtual private cloud. Such communications resources may be useful in facilitating data communications between components within the execution environment 227, as well as data communications between the execution environment 227 and computing devices that are outside of the execution environment 227 (e.g., computing devices that are included within an autonomous vehicle).

The execution environment 227 depicted in FIG. 6 also includes processing resources 612 that may be useful in useful in executing computer program instructions and performing other computational tasks within the execution environment 227. The processing resources 612 may include one or more application-specific integrated circuits ('ASICs') that are customized for some particular purpose, one or more central processing units ('CPUs'), one or more digital signal processors ('DSPs'), one or more field-programmable gate arrays ('FPGAs'), one or more systems on a chip ('SoCs'), or other form of processing resources 612. The processing resources 612 may also be embodied, in embodiments where the execution environment 227 includes resources offered by a cloud provider, as cloud computing resources such as one or more Amazon Elastic Compute Cloud ('EC2') instances, event-driven compute resources such as AWS Lambdas, Azure Virtual Machines, or many others.

The execution environment 227 depicted in FIG. 6 also includes software resources 613 that, when executed by processing resources 612 within the execution environment 227, may perform various tasks. The software resources 613 may include, for example, one or more modules of computer program instructions that when executed by processing resources 612 within the execution environment 227 are useful in training neural networks configured to determine control autonomous vehicle control operations. For example, a training module 614 may train a neural network using training data including sensor 212 data and control operations recorded or captured contemporaneous to the training data. In other words, the neural network may be trained to encode a relationship between an environment relative to an autonomous vehicle 100 as indicated in sensor 212 data and the corresponding control operations effected by a user or operation of the autonomous vehicle. The training module 614 may provide a corpus of training data, or a selected subset of training data, to train the neural network. For example, the training module 614 may select particular subsets of training data associated with particular driving conditions, environment states, etc. to train the neural network.

The software resources 613 may include, for example, one or more modules of computer program instructions that when executed by processing resources 612 within the execution environment 227 are useful in deploying software resources or other data to autonomous vehicles 100 via a network 618. For example, a deployment module 616 may provide software updates, neural network updates, or other data to autonomous vehicles 100 to facilitate autonomous vehicle control operations.

The software resources 613 may include, for example, one or more modules of computer program instructions that when executed by processing resources 612 within the execution environment 227 are useful in collecting data from autonomous vehicles 100 via a network 618. For example, a data collection module 620 may receive, from autonomous vehicles 100, collected sensor 212, associated control operations, software performance logs, or other data. Such data may facilitate training of neural networks via the training module 614 or stored using storage resources 608.

Figure 7:
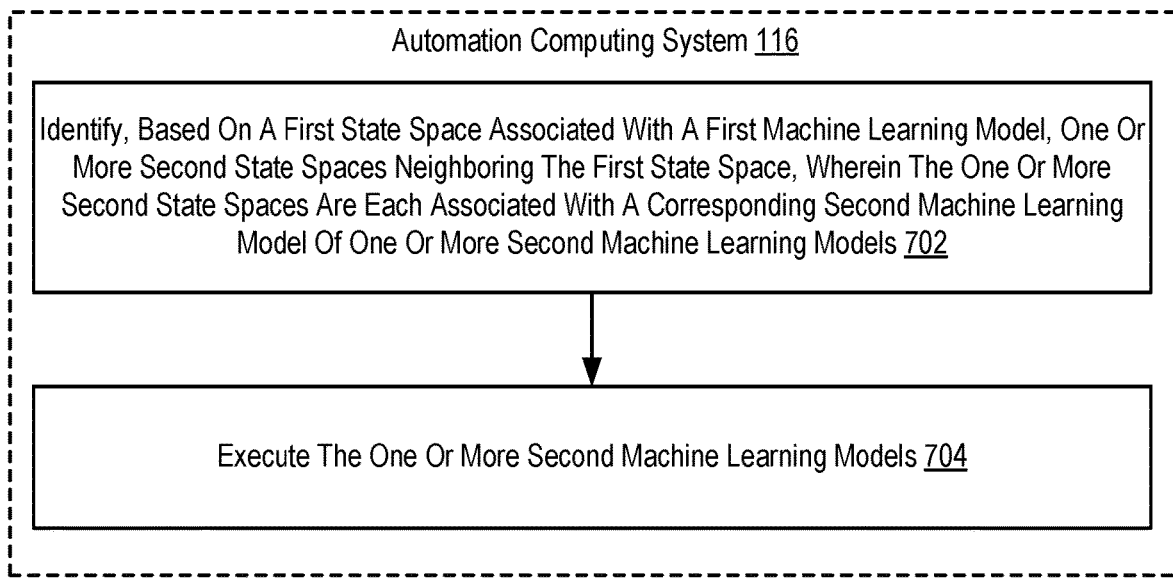
FIG. 7 is a flowchart of an example method for selective model execution in an autonomous vehicle according to embodiments of the present disclosure.

For further explanation, FIG. 7 sets forth a flow chart illustrating an example method for selective model execution in an autonomous vehicle. As is described above, an automation computing system 116 may use one or more machine learning models to determine control operations for an autonomous vehicle 100 based on various inputs, including sensor data from one or more sensors 212. The various control operations that an automation computing system 116 may signal may be expressed as a state machine. Each state may correspond to a different maneuver (e.g., applying a particular amount of brake or acceleration, turning at a particular angle, etc.). Accordingly, a machine learning model may determine control operations by determining whether to perform a state transition within the state machine. As all states and transitions are determined in advance, the use of a state machine expression for autonomous vehicle control operations allow for a complete state machine that may be verified against all possible driving scenarios.

One possible implementation of using machine learning models to determine control operations is to have a single machine learning model with a given task that accepts all ranges of inputs that may be used for that task. For example, a distance keeping model used during cruising may be used to ensure that the autonomous vehicle maintains a safe distance relative to other vehicles on the road and other objects in the environment. This single machine learning model accepts, as input, all possible velocities for the autonomous vehicle, as well as any sensor data that may be useful (e.g., camera data, accelerometer data, GPS data, etc.). Due to the various ranges and types of inputs, such a model may be computationally complex and difficult to implement.

Alternatively, a model for a given task may be decomposed into multiple models each associated with different behavioral domains. In other words, a model may be parameterized such that one of many models is used to generate control operations depending on attributes of the autonomous vehicle used to delineate the behavioral domains. For example, instead of having a single distance keeping model, an autonomous vehicle may one of many distance keeping models each corresponding to a different range of velocities. As an example, a first distance keeping model may be used when the car is traveling less than 10 miles per hour, a second distance keeping model may be used when the car is traveling 10-30 miles per hour, a third distance keeping model may be used when the car is traveling 30-50 miles per hour, and a fourth distance keeping model is used when the car is traveling greater than 50 miles per hour. In this example, each behavioral domain corresponds to a different range of velocities, and the velocity of the autonomous vehicle is used to delineate each behavioral domain.

When using parameterized models, such as the different distance keeping models described above, the different parameterized models may use different inputs to improve computational efficiency. For example, the first distance keeping model used when the car is traveling less than 10 miles per hour may only use the velocity and stereoscopic camera data as inputs. Other models used at greater velocities may use additional data as inputs, such as GPS data, additional camera data, accelerometer data, and the like.

As is set forth above, a machine learning model used to determine control operations may use a state machine encoding various control operations or maneuvers performable by the autonomous vehicle 100. Similarly, each parameterized machine learning model may have its own state space within a state machine. While a particular parameterized machine learning model is being used to generate control operations for the autonomous vehicle 100, the particular parameterized machine learning model is determining control operations based on the state space for that model. If the behavioral domain changes due to the parameterizing value changing or another event, the current state will transition to a state in a space of the machine learning model for the new behavioral domain. As an example, assume that the autonomous vehicle 100 is traveling less than 10 miles per hour and the first distance keeping model described above is in use. Further assume that the current state of the state space for the first distance keeping model causes the autonomous vehicle 100 to accelerate. At some point, the autonomous vehicle 100 will cross the 10 miles per hour threshold. This will cause the current state of the autonomous vehicle 100 to transition to the state space of the second distance keeping model used for 10-30 miles per hour. The second distance keeping model will then be used to generate the control operations for the autonomous vehicle 100.

Assuming multiple parameterized machine learning models each with their own state space, one skilled in the art will appreciate that certain state spaces are not directly reachable from another state space. In other words, there may be no direct transition between a state in a given state space to a state in some other state space. Continuing with the example above using parameterized distance keeping models, while operating in the state space of the first distance keeping model for 0-10 miles per hour, the state space of the second distance keeping model for 10-30 miles per hour is directly reachable. Where a state space may be transitioned to from a given state space, such a state space is considered "neighboring" the given state space. Conversely, the state space of the third distance keeping model for 30-50 miles per hour is not directly reachable from the state space of the first distance keeping model as there is no way to directly transition from traveling 0-10 miles per hour to 30-50 miles per hour. One must necessarily transition from the state space of the first distance keeping model to the state space of the second distance keeping model before transitioning to the state space of the third distance keeping model. Accordingly, the state space of the third distance keeping model is not neighboring the state space of the third distance keeping model. As another example, the state spaces of the first and third distance keeping models are neighboring the state space of the second distance keeping model, while the state space of the fourth distance keeping model is not neighboring the second distance keeping model.

In order to transition between state spaces, a transition must be performed from a first model in a first state space to a second model in a second, neighboring state space. Where a direct transition exists between a first model and a second model, such models are considered to be "neighboring models."

Parameterized machine learning models as set forth above are described as being parameterized using velocity. One skilled in the art will appreciate that ranges for any other continuous value may also be used to delineate behavioral domains for machine learning models, and therefore define transitions between state spaces of such parameterized machine learning models. One skilled in the art will also appreciate that machine learning models may also be parameterized using other criteria or events, such as various error states of hardware, software, or sensors, environmental conditions, and the like.

One skilled in the art will also appreciate that the state spaces of a given parameterized machine learning model may neighbor the state spaces of other machine learning models, which may also be parameterized machine learning models. Continuing with the example above using parameterized distance keeping models, assume that the automation computing system 116 also implements collision avoidance models used to avoid sudden hazards or other emergencies. Further assume that the automation computing system 116 implements parameterized collision avoidance models that are delineated based on velocity similar to the distance keeping model. A transition from using a distance keeping model to a collision avoidance model may be triggered by an output from another machine learning model (e.g., an object identifier or hazard identifier model). In this example, assume that a hazard is detected while the autonomous vehicle 100 is traveling 10-30 miles per hour, and is therefore using the second distance keeping model. In response to the detected hazard, the automation computing system 116 switches to using a second collision avoidance model for 10-30 miles per hour by transitioning to the state space of the second collision avoidance model. In this example, the second collision avoidance model is considered "neighboring" the second distance keeping model as there is a direct transition between their respective state spaces (e.g., the detected hazard). Conversely, the second distance keeping model state space would not be neighboring a third collision avoidance model state space for 30-50 miles per hour. A transition would need to occur from the second distance keeping model state space to either the third distance keeping model state space or the second collision avoidance model state space before reaching the third collision avoidance model state space.

Accordingly, various signals may cause a transition from one state space to another state space, including an operational parameter of an autonomous vehicle crossing a threshold (e.g., velocity crossing a velocity threshold), an output of a machine learning model (e.g., a hazard identifier indicating an imminent collision), a user input (e.g., manual operation of a steering wheel), or a detected error (e.g., a hardware error, a software error, including permanent and transient errors).

Turning back to FIG. 7, the method of FIG. 7 includes identifying 702 (e.g., by an automation computing system 116), based on a first state space associated with a first machine learning model, one or more second state spaces neighboring the first state space, wherein the one or more second state spaces are each associated with a corresponding second machine learning model of one or more second machine learning models. The first state space may include a current state of an autonomous vehicle 100 or autonomous computing system 116. For example, the first state space may include a current state corresponding to a currently executed or last determined control operation as determined by the first machine learning model associated with the first state space. The first state space may encode a plurality of control operations for the autonomous vehicle 100 and encode, as state transitions, possible transitions between each of the control operations. In other words, the first machine learning model may be configured to generate control operations according to the first state space.

The one or more second machine learning models may also be configured to generate control operations for the autonomous vehicle 100 based on their respective second state spaces. The second state spaces may also each encode a plurality of control operations and encode, as state transitions, possible transitions between each of the control operations. The first machine learning model and one or more of the second machine learning models may be parameterized machine learning models for a same type of machine learning model. As an example, the first machine learning model and one or more of the second machine learning models may be parameterized distance keeping models each corresponding to different ranges of velocity (e.g., parameterized or delineated based on the velocity of the autonomous vehicle). The first machine learning model and one or more of the second machine learning models may also correspond to different types of machine learning models. For example, the first machine learning model may be a distance keeping model while one or more of the second machine learning models may be a collision avoidance model that may be transitioned to by detecting an imminent collision.

The state spaces of the second machine learning models (e.g., the one or more second state spaces) neighbor the state space of the first machine learning model (e.g., the first state space). In other words, there is a direct transition between the first state space any the one or more second state spaces. Identifying 702 the one or more second state spaces may include enumerating each transition from the first state space to identify any other state space that may be directly transitioned to.

The method of FIG. 7 also includes executing 704 (e.g., by the automation computing system 116) the one or more second machine learning models. As is set forth above, the one or more second machine learning models correspond to one or more second state spaces neighboring the first state space. In other words, the one or more second state spaces may be directly transitioned to from the first state space. Accordingly, an event may occur that causes a state transition to a second state space, thereby causing a second machine learning model to be used to generate control operations instead of the first machine learning model. By selectively executing the one or more second machine learning models whose state spaces neighbor the first state space, machine learning models that may soon be needed for control operations are already executed. This reduces delay in transitioning between state spaces and machine learning models. Moreover, where the second machine learning models require some prepopulation of data or other preconditions before generating control operations, this reduces or eliminates the time for the second machine learning models to satisfy their preconditions prior after transition. Though the one or more second machine learning models may be executed concurrently to the first machine learning model, it is understood that the output of the first machine learning model may be the bases for executing control operations for the autonomous vehicle 100, and that the output of the one or more second machine learning models may not be used or executed until an explicit state transition to a second state space.

As an example, assume a first state space A corresponding to first machine learning model A and a second state space B corresponding to second machine learning model B. Further assume that machine learning models A and B are parameterized distance keeping models, where A corresponds to velocities below 10 miles per hour, and B corresponds to velocities of 10-30 miles per hour. Here, state space B neighbors state space A. Assuming that the automation computing system 1116 is operating within state space A, state space B would be identified 702 as a neighboring state space and machine learning model B would be executed 704.

Figure 8:
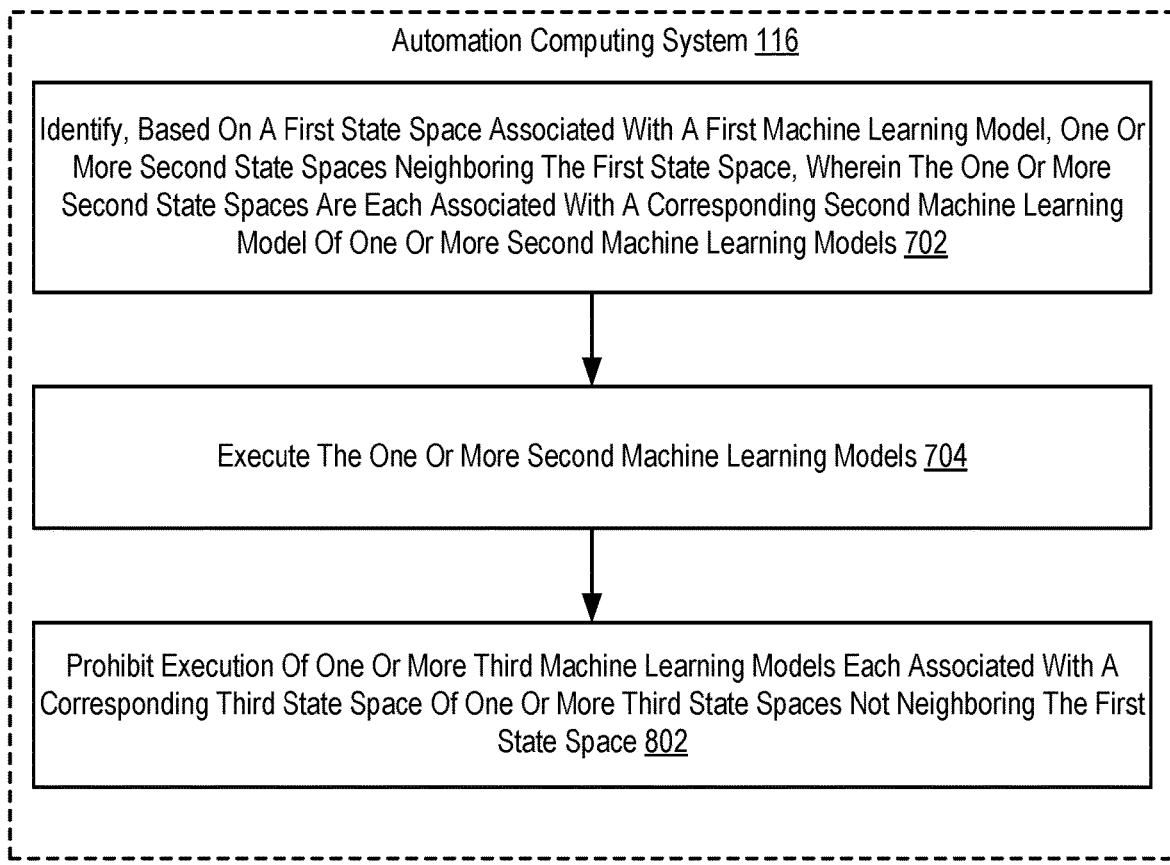
FIG. 8 is a flowchart of another example method for selective model execution in an autonomous vehicle according to embodiments of the present disclosure.

For further explanation, FIG. 8 sets forth a flow chart illustrating another example method for selective model execution in an autonomous vehicle according to embodiments of the present disclosure. FIG. 8 is similar to FIG. 7 in that the method of FIG. 8 also includes identifying 702, based on a first state space associated with a first machine learning model, one or more second state spaces neighboring the first state space, wherein the one or more second state spaces are each associated with a corresponding second machine learning model of one or more second machine learning models; and executing 704 the one or more second machine learning models.

FIG. 8 differs from FIG. 7 in that the method of FIG. 8 includes prohibiting 802 execution of one or more third machine learning models each associated with a corresponding third state space of one or more third state spaces not neighboring the first state space. The one or more third state spaces are not directly reachable by a transition from the first state space (e.g., that includes the current state). Accordingly, their corresponding third machine learning models are prohibited from execution in order to conserve computational resources associated with their execution. In some embodiments, prohibiting 802 execution of a third machine learning model includes terminating or ending an execution of a currently executed third machine learning model. For example, allocated resources in association with executing the third machine learning model may be freed or released. In other embodiments, prohibiting 802 execution of a third machine learning model includes preventing or refraining from executing the third machine learning model.

Continuing with the example of FIG. 7 using state spaces and machine learning models A/B, further assume state spaces and machine learning models C and D. Further assume that machine learning models C and D are parameterized distance keeping models, where C corresponds to velocities of 30-50 miles per hour, and D corresponds to velocities of greater than 50 miles per hour. Where the autonomous vehicle 100 is traveling less than 10 miles per hour, state space B is neighboring the current state space A, while state spaces C and D are not neighboring the current state space A. Accordingly, as there is no direct transition from state space A to state spaces C and D, machine learning models C and D are prevented from execution.

Figure 9:
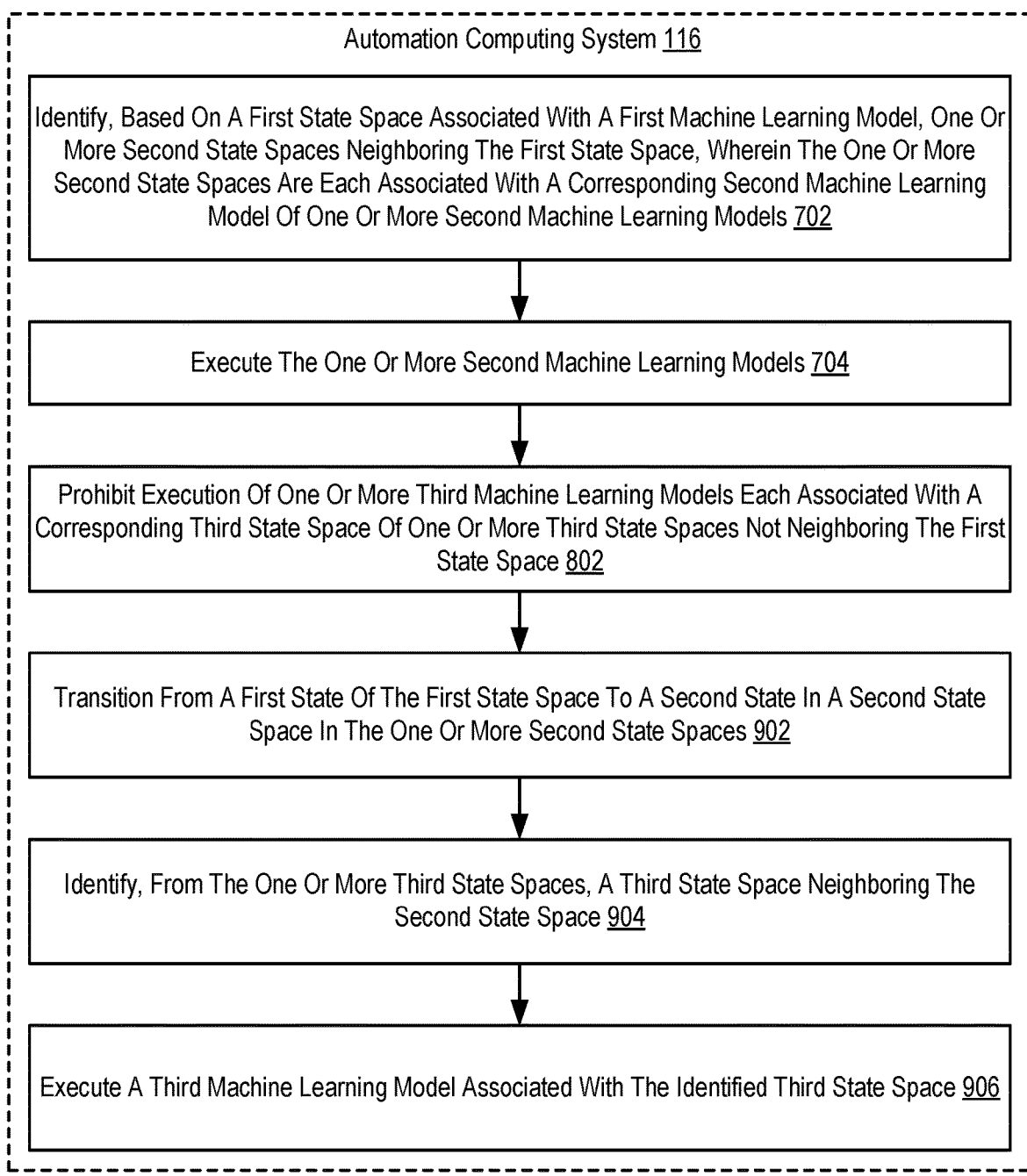
FIG. 9 is a flowchart of another example method for selective model execution in an autonomous vehicle according to embodiments of the present disclosure.

For further explanation, FIG. 9 sets forth a flow chart illustrating another example method for selective model execution in an autonomous vehicle according to embodiments of the present disclosure. FIG. 9 is similar to FIG. 8 in that the method of FIG. 9 also includes identifying 702, based on a first state space associated with a first machine learning model, one or more second state spaces neighboring the first state space, wherein the one or more second state spaces are each associated with a corresponding second machine learning model of one or more second machine learning models; executing 704 the one or more second machine learning models; and prohibiting 802 execution of one or more third machine learning models each associated with a corresponding third state space of one or more third state spaces not neighboring the first state space.

FIG. 9 differs from FIG. 8 in that the method of FIG. 9 includes transitioning 902 from a first state of the first state space to a second state in a second state space in the one or more second state spaces. In other words, a transition occurs from the first state to a second state in a neighboring state space. As the automation computing system 116 is now in the second state space, a second machine learning model corresponding to the second state space may be used to generate control operations for the autonomous vehicle 100. In other words, the output of the second machine learning model may be executed in order to operate the autonomous vehicle.

The method of FIG. 9 also includes identifying 904, from the one or more third state spaces, a third state space neighboring the second state space. Though the one or more third state spaces did not neighbor the first state space, a third state space may neighbor the second state space. Continuing with the example of FIG. 8, state spaces C and D did not neighbor state space A. Accordingly, the execution of machine learning models C and D was prohibited. Assume that a transition occurs from state space A to state space B. For example, assume that the autonomous vehicle 100 accelerated over 10 miles per hour. Here, state space C neighbors state space B and would be identified 904 as a third state space neighboring the second state space.

The method of FIG. 9 also includes executing 906 a third machine learning model associated with the identified third state space. As the identified third state space may be transitioned to from the current second state space, the associated third machine learning model is executed in order to prepare for a possible transition to the identified third state space. Continuing with the example, above, machine learning model C corresponding to the identified state space C would be executed, while execution of machine learning model D remains prohibited. Thus, machine learning models A, B, and C are executed, with machine learning model B being used to generate the executed control operations of the autonomous vehicle 100.

Figure 10:
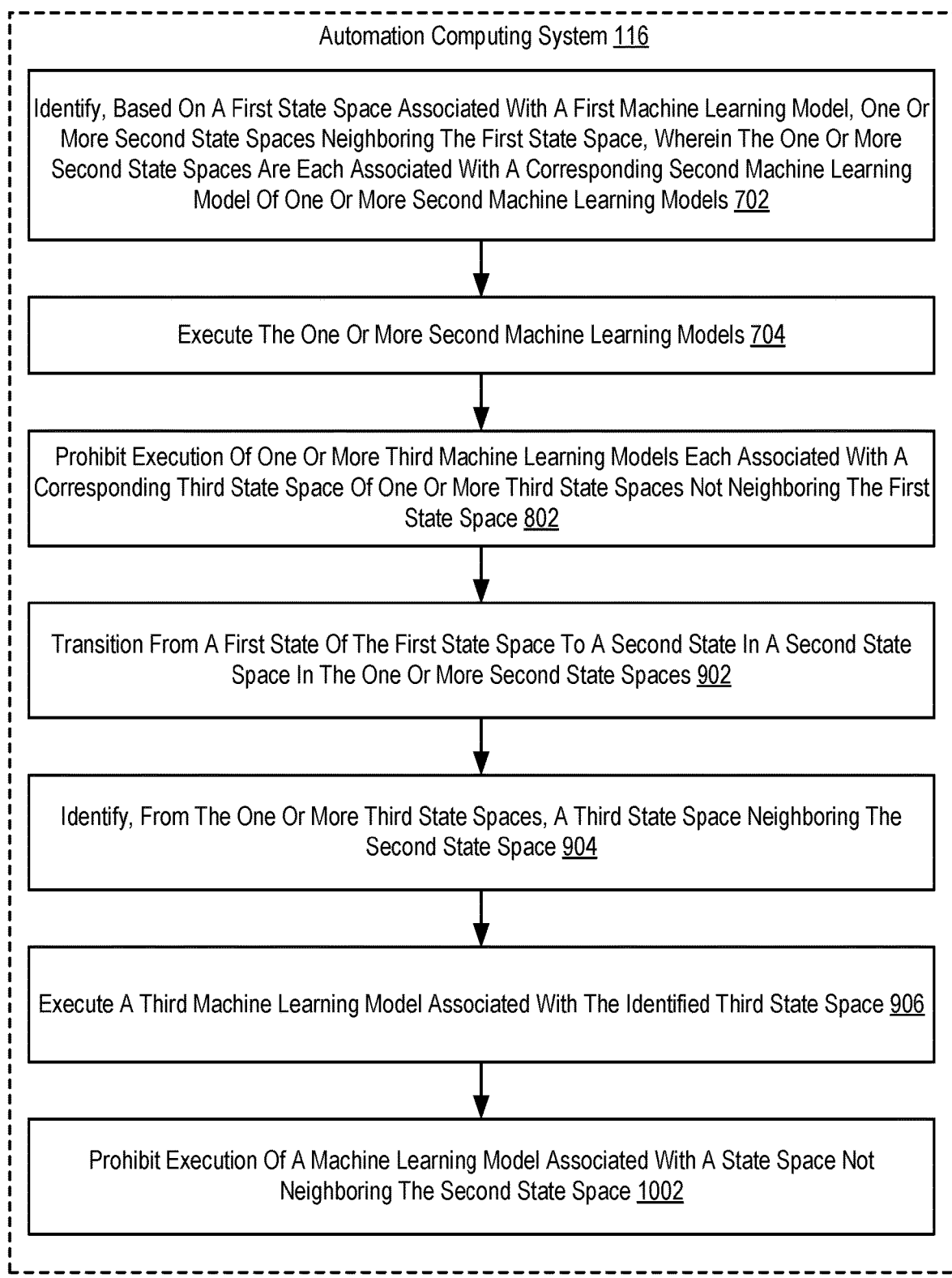
FIG. 10 is a flowchart of another example method for selective model execution in an autonomous vehicle according to embodiments of the present disclosure.

For further explanation, FIG. 10 sets forth a flow chart illustrating another example method for selective model execution in an autonomous vehicle according to embodiments of the present disclosure. FIG. 10 is similar to FIG. 9 in that the method of FIG. 10 also includes identifying 702, based on a first state space associated with a first machine learning model, one or more second state spaces neighboring the first state space, wherein the one or more second state spaces are each associated with a corresponding second machine learning model of one or more second machine learning models; executing 704 the one or more second machine learning models; prohibiting 802 execution of one or more third machine learning models each associated with a corresponding third state space of one or more third state spaces not neighboring the first state space; transitioning 902 from a first state of the first state space to a second state in a second state space in the one or more second state spaces; identifying 904, from the one or more third state spaces, a third state space neighboring the second state space; and executing 906 a third machine learning model associated with the identified third state space.

The method of FIG. 10 differs from FIG. 9 in that the method of FIG. 10 includes prohibiting 1002 execution of a machine learning model associated with a state space not neighboring the second state space. In some embodiments, the machine learning model associated with a state space not neighboring the second state space may currently be unexecuted by virtue of being prohibited during some other state. Continuing with the example above, state space D does not neighbor current state space B, but execution of machine learning model D was already prohibited while in the first state space. Accordingly, prohibiting 1002 execution of machine learning model D would include refraining from executing machine learning model D.

In other embodiments, prohibiting 1002 execution of a machine learning model associated with a state space not neighboring the second state space includes terminating an executed instance of a machine learning model. Continuing with the example above, further assume parameterized collision avoidance models A', B', C', and D' each associated with velocity ranges of less than 10 miles per hour, 10-30 miles per hour, 30-50 miles per hour, and greater than 50 miles per hour, respectively. While in the first state space (distance keeping model A state space), collision avoidance model A' would be executed as its state space neighbors the distance keeping model A state space by virtue of a direct transition between the two (e.g., a detected hazard). After transitioning to the second state space (distance keeping model B state space), the state space of collision avoidance model A' would not neighbor the second state space. Accordingly, execution of collision avoidance model A' would be terminated.

As a further example, assume that a state transition occurred from state space B to state space C. Here, machine learning model A would be terminated as state space A does not neighbor state space C, and machine learning model D would begin execution as state space D neighbors state space C.

Figure 11:
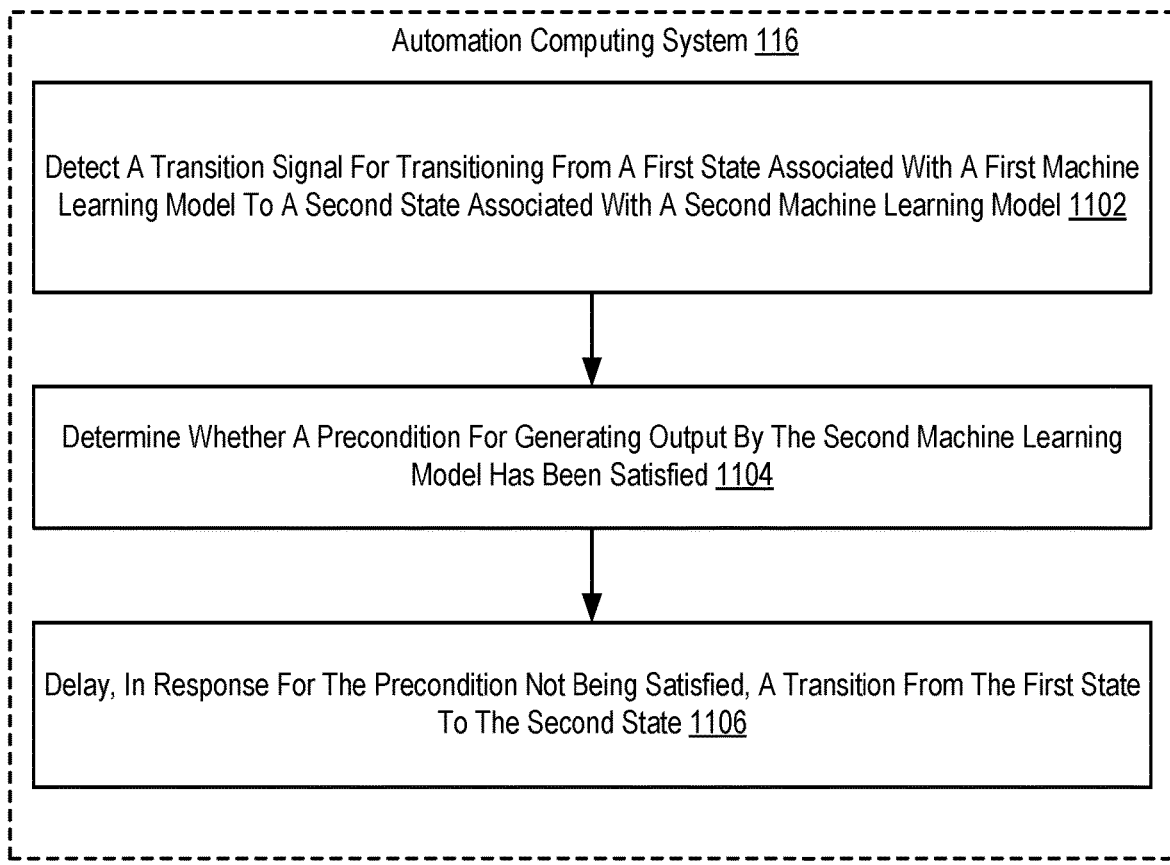
FIG. 11 is a flowchart of an example method for scheduling state transitions in an autonomous vehicle according to embodiments of the present disclosure.

For further explanation, FIG. 11 sets forth a flow chart illustrating an example method for selective model execution in an autonomous vehicle according to embodiments of the present disclosure. The method of FIG. 11 includes detecting 1102 (e.g., by an automation computing system 116) a transition signal for transitioning from a first state associated with a first machine learning model to a second state associated with a second machine learning model. The first state may be included in a first state space associated with the first machine learning model and the second state may be included in a second state space associated with a second machine learning model. For example, the first machine learning model and the second machine learning model may be each configured to determine control operations for an autonomous vehicle 100. Accordingly, the first state space and second state space may each encode a plurality of control operations and transitions between control operations within their respective state spaces. The first machine learning model may include a machine learning model whose generated control operations are configured to be executed by the automation computing system 116. Accordingly, the first state may include a current state of the autonomous vehicle 116.

In some embodiments, the first machine learning model and the second machine learning models are parameterized machine learning models for a same type of machine learning model. For example, both the first machine learning model and the second machine learning model may be parameterized distance keeping models, collision avoidance models, and the like, and are each associated with a different behavioral domain. Accordingly, in such an embodiment, the transition signal may include an operational parameter of the autonomous vehicle passing a threshold. For example, assume that the first machine learning model is a first distance keeping model for use when the velocity of the autonomous vehicle 100 is between 30-50 miles per hour, and the second machine learning model is a second distance keeping model for use when the velocity of the autonomous vehicle 100 is over 50 miles per hour. Accordingly, detecting the transition signal would include detecting that the velocity of the autonomous vehicle 100 has crossed the 50 miles per hour threshold.

As another example, the first machine learning model and the second machine learning model may include parameterized machine learning models whose behavioral domains are differentiated by different hardware error states. For example, the first machine learning model may include a distance keeping model for use when all forward-facing cameras are operational, and the second machine learning model may include a distance keeping model for when only a single forward-facing camera is operational (e.g., stereoscopic vision is unavailable). Accordingly, detecting the transition signal would include detecting that only a single forward-facing camera is operational (e.g., detecting that one of two available cameras is no longer operational). One skilled in the art will appreciate that other error events may also correspond to transition signals between states. Moreover, one skilled in the art will appreciate that an error recovery event may also correspond to a transition signal between states. For example, a previously defective camera becoming operational would generate a transition signal from the second state back to the first state.

As a further example, the first machine learning model and the second machine learning model may include machine learning models (parameterized or non-parameterized) of different types. For example, the first machine learning model may include a distance keeping model and the second machine learning model may include a collision avoidance model. Accordingly, the transition signal may include an output from another machine learning model (e.g., an object detection or hazard avoidance model). For example, an object detection model may detect an object approaching the autonomous vehicle 100 and generate an output indicating that a collision is imminent. Such an output would serve as a transition signal to transition from the first state in the state space of the distance keeping model to the second state in the state space of the collision avoidance model. Other events, such as user intervention or interaction with a steering wheel or other controls may also serve as transition signals between the first state and the second state.

The method of FIG. 11 also includes determining 1104 whether a precondition for generating output by the second machine learning model has been satisfied. A machine learning model may have certain preconditions or prerequisites satisfied before being able to generate output, such as control operations. As an example, a machine learning model may require a certain amount of input data be provided to the machine learning model before generating output. For example, a machine learning model may require that N frames (e.g., N sequential or most-recent frames) of image or video data be provided as input before it is able to generate its output. As another example, a machine learning model may require an amount of input data from another machine learning model before the machine learning model is able to provide an output. For example, assuming a real-time system where machine learning models generate output at particular intervals, a given machine learning model may need N intervals of data provided by another machine learning model before it is able to generate its own output. As a further example, a machine learning model may need to be active or receiving input for a predefined amount of time before it is able to generate output.

The method of FIG. 11 also includes delaying 1106, in response to the precondition not being satisfied, a transition from the first state to the second state. Where the precondition is not satisfied, the second machine learning model associated with the second state (e.g., associated with the second state space including the second state) is unable to generate output (e.g., control operations) despite the second machine learning model being currently executed. Accordingly, a transition to the second state and attempting to use output from the second machine learning model may cause errors or unexpected results in the automation computing system 116.

By delaying 1106 the transition from the first state to the second state, the automation computing system 116 will still execute the control operations generated by the first machine learning model instead of the second machine learning model despite having detected 1102 the transition signal. For example, assume that the first machine learning model is a first distance keeping model for use when the velocity of the autonomous vehicle 100 is between 10-30 miles per hour with two operational front-facing cameras, and the second machine learning model is a second distance keeping model for use when the velocity of the autonomous vehicle 100 is between 10-30 miles per hour and with a single operational front-facing camera. Further assume that one of the front-facing cameras stops operating, causing a transition signal from the first state to the second state.

Continuing with this example, assume that the second machine learning model requires 500 ms of image data before being able to generate control operations for the autonomous vehicle 100, and that the second machine learning model had been executed for less than 500 ms when the camera failure was detected. For example, execution of the second machine learning model, whose second state space neighbors the first state space, may have been selectively initiated (see FIGS. 7-10) in response to a transition to the first state space. The camera may have failed shortly after transitioning to the first state space, resulting in the second machine learning model not having enough time to prepopulate its input data. Thus, transitioning from the first state to the second state, and the use of the second machine learning model instead of the first machine learning model, is delayed until the precondition is satisfied. One skilled in the art will appreciate that the automation computing system 116 may employ various error correction or compensation methods in response to delaying the transition from the first state to the second state. For example, the automation computing system 116 may generate predicted or simulated camera data in place of the data from the defective camera. The generated camera data may then be provided as input to the first machine learning model along with camera data from the functional camera. Thus, the first machine learning model may still output control operations until the precondition is satisfied and the transition from the first state to the second state may be performed.

Figure 12:
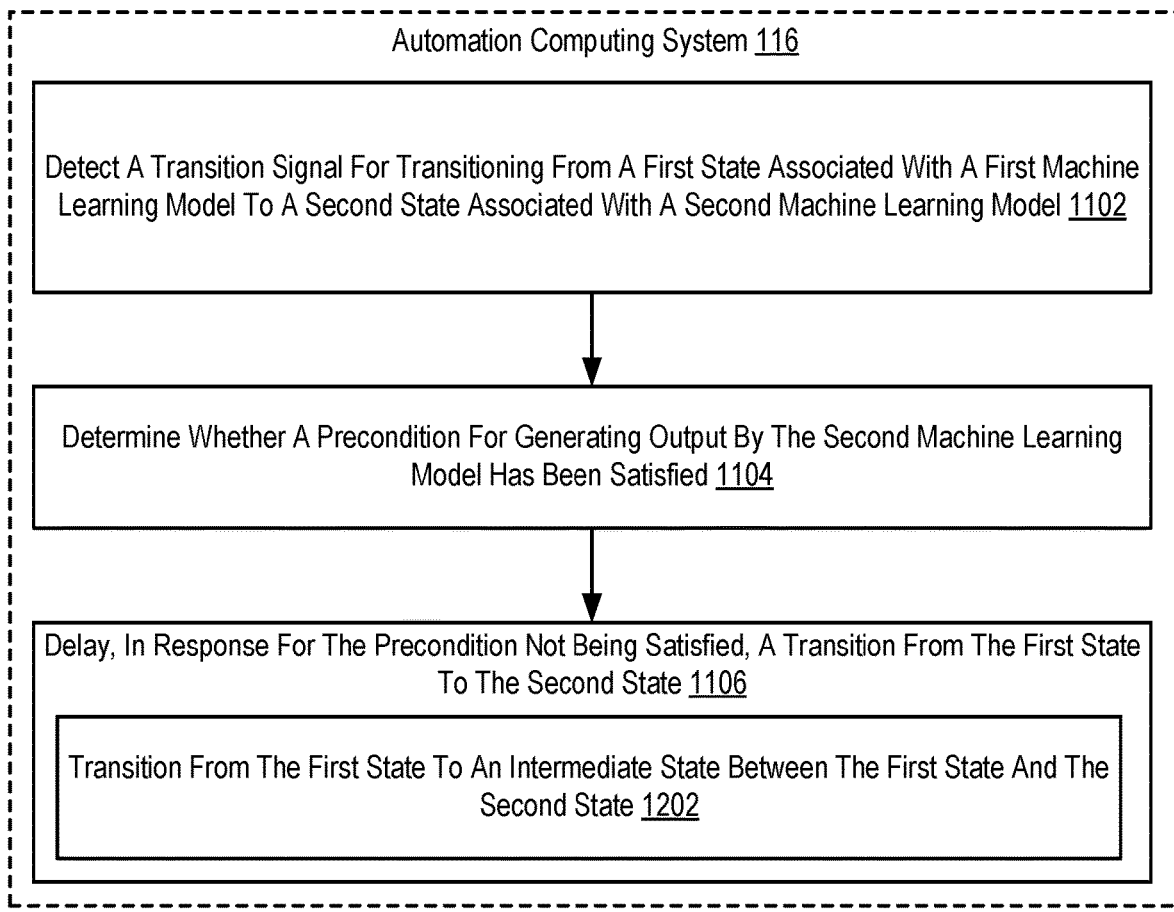
FIG. 12 is a flowchart of an example method for scheduling state transitions in an autonomous vehicle according to embodiments of the present disclosure.

For further explanation, FIG. 12 sets forth a flow chart illustrating another example method for selective model execution in an autonomous vehicle according to embodiments of the present disclosure. FIG. 12 is similar to FIG. 11 in that the method of FIG. 12 includes detecting 1102 (e.g., by an automation computing system 116) a transition signal for transitioning from a first state associated with a first machine learning model to a second state associated with a second machine learning model; determining 1104 whether a precondition for generating output by the second machine learning model has been satisfied; and delaying 1106, in response to the precondition not being satisfied, a transition from the first state to the second state.

FIG. 12 differs from FIG. 11 in that delaying 1106, in response to the precondition not being satisfied, a transition from the first state to the second state includes transitioning

1202 from the first state to an intermediate state between the first state and the second state. For example, assume that the first state has a transition condition to the intermediate state satisfied by the detected 1102 transition signal. The intermediate state has a transition condition to the second state in response to the precondition for the second machine learning model being satisfied. Accordingly, a transition from the first state to the intermediate state indicates that the transition signal has been detected 1102, but that the precondition for the second machine learning model generating its output has not been satisfied. In some embodiments, the intermediate state is considered to be included in the first state space associated with the first machine learning model as the first machine learning model is still the source of control operations for the autonomous vehicle 100.

Figure 13:
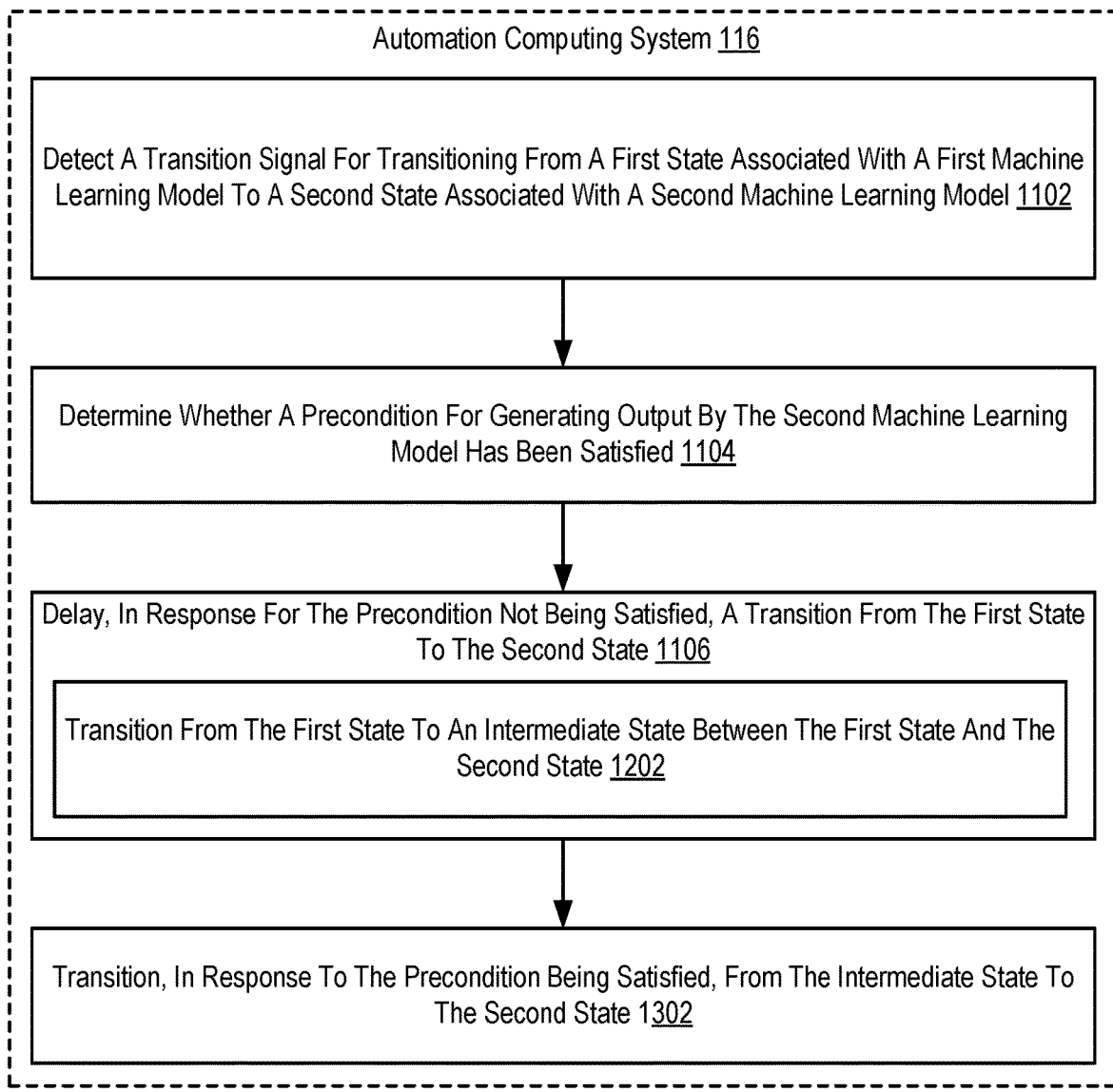
FIG. 13 is a flowchart of an example method for scheduling state transitions in an autonomous vehicle according to embodiments of the present disclosure.

For further explanation, FIG. 13 sets forth a flow chart illustrating another example method for selective model execution in an autonomous vehicle according to embodiments of the present disclosure. FIG. 13 is similar to FIG. 12 in that the method of FIG. 13 includes detecting 1102 (e.g., by an automation computing system 116) a transition signal for transitioning from a first state associated with a first machine learning model to a second state associated with a second machine learning model; determining 1104 whether a precondition for generating output by the second machine learning model has been satisfied; and delaying 1106, in response to the precondition not being satisfied, a transition from the first state to the second state by transitioning 1202 from the first state to an intermediate state between the first state and the second state.

FIG. 13 differs from FIG. 12 in that the method of FIG. 13 also includes transitioning 1302, in response to the precondition being satisfied, from the intermediate state to the second state. In other words, satisfaction of the precondition serves as a transition signal for transitioning from the intermediate state to the second state. As the precondition has been satisfied, the second machine learning model can be used to generate output (e.g., control operations) for execution.

In view of the explanations set forth above, readers will recognize that the benefits of selective model execution in an autonomous vehicle and scheduling state transitions in an autonomous vehicle according to embodiments of the present invention include:

Improved performance of a computing system by only executing machine learning models whose corresponding states are reachable from a current state, preventing the use of computational resources on machine learning models that are not directly reachable.

Improved performance of a computing system by scheduling the transitions between states based on preconditions for generating machine learning output, preventing erroneous or unexpected behaviors in an automation computing system.

Exemplary embodiments of the present invention are described largely in the context of a fully functional computer system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method, comprising:
detecting a transition signal for transitioning from a first state associated with a first machine learning model to a second state associated with a second machine learning model, wherein an autonomous vehicle is configured to use the first machine learning model instead of the second machine learning model when in the first state, and wherein the autonomous vehicle is configured to use the second machine learning model instead of the first machine learning model when in the second state;
detecting, subsequent to detecting the transition signal, that a precondition for generating output by the second machine learning model is unsatisfied, wherein the precondition comprises a predefined number of frames of image data input to the second machine learning model; and
delaying, until the precondition for generating output by the second machine learning model is satisfied, use of the second machine learning model instead of the first machine learning model by delaying a transition from the first state to the second state.

2. The method of claim 1, wherein delaying the transition from the first state to the second state comprises transitioning from the first state to an intermediate state between the first state and the second state.

3. The method of claim 2, further comprising transitioning, when the precondition is satisfied, from the intermediate state to the second state.

4. The method of claim 1, wherein the first state is included in a first state space associated with the first machine learning model and the second state is included in a second state space associated with the second machine learning model.

5. The method of claim 1, wherein the first machine learning model and the second machine learning model are configured to generate one or more control actions for the autonomous vehicle.

6. The method of claim 1, wherein the precondition comprises a predefined number of outputs of a third machine learning model having been provided to the second machine learning model.

7. The method of claim 1, wherein the transition signal comprises one or more of: an operational parameter of the autonomous vehicle crossing a threshold, an output of a machine learning model, a user input, or a detected error.

8. An apparatus configured to perform steps, comprising:
   detecting a transition signal for transitioning from a first state associated with a first machine learning model to a second state associated with a second machine learning model, wherein an autonomous vehicle is configured to use the first machine learning model instead of the second machine learning model when in the first state, and wherein the autonomous vehicle is configured to use the second machine learning model instead of the first machine learning model when in the second state;
   detecting, subsequent to detecting the transition signal, that a precondition for generating output by the second machine learning model is unsatisfied, wherein the precondition comprises a predefined number of frames of image data input to the second machine learning model; and
   delaying, until the precondition for generating output by the second machine learning model is satisfied, use of the second machine learning model instead of the first machine learning model by delaying a transition from the first state to the second state.

9. The apparatus of claim 8, wherein delaying the transition from the first state to the second state comprises transitioning from the first state to an intermediate state between the first state and the second state.

10. The apparatus of claim 9, wherein the steps further comprise transitioning, when the precondition is satisfied, from the intermediate state to the second state.

11. The apparatus of claim 8, wherein the first state is included in a first state space associated with the first machine learning model and the second state is included in a second state space associated with the second machine learning model.

12. The apparatus of claim 8, wherein the first machine learning model and the second machine learning model are configured to generate one or more control actions for the autonomous vehicle.

13. The apparatus of claim 8, wherein the precondition comprises a predefined number of outputs of a third machine learning model having been provided to the second machine learning model.

14. The apparatus of claim 8, wherein the transition signal comprises one or more of: an operational parameter of the autonomous vehicle crossing a threshold, an output of a machine learning model, a user input, or a detected error.

15. An autonomous vehicle, comprising:
   an apparatus configured to perform steps comprising:
   detecting a transition signal for transitioning from a first state associated with a first machine learning model to a second state associated with a second machine learning model, wherein an autonomous vehicle is configured to use the first machine learning model instead of the second machine learning model when in the first state, and wherein the autonomous vehicle is configured to use the second machine learning model instead of the first machine learning model when in the second state;
   detecting, subsequent to detecting the transition signal, that a precondition for generating output by the second machine learning model is unsatisfied, wherein the precondition comprises a predefined number of frames of image data input to the second machine learning model; and
   delaying, until the precondition for generating output by the second machine learning model is satisfied, use of the second machine learning model instead of the first machine learning model by delaying a transition from the first state to the second state.

16. The autonomous vehicle of claim 15, wherein delaying the transition from the first state to the second state comprises transitioning from the first state to an intermediate state between the first state and the second state.

17. The autonomous vehicle of claim 16, wherein the steps further comprise transitioning, when the precondition is satisfied, from the intermediate state to the second state.

18. The autonomous vehicle of claim 15, wherein the first state is included in a first state space associated with the first machine learning model and the second state is included in a second state space associated with the second machine learning model.

19. The autonomous vehicle of claim 15, wherein the first machine learning model and the second machine learning model are configured to generate one or more control actions for the autonomous vehicle.

20. A computer program product disposed upon a non-transitory computer-readable medium, the computer program product comprising computer program instructions for scheduling state transitions in an autonomous vehicle that, when executed, cause a computer system of the autonomous vehicle to carry out the steps of:
   detecting a transition signal for transitioning from a first state associated with a first machine learning model to a second state associated with a second machine learning model, wherein an autonomous vehicle is configured to use the first machine learning model instead of the second machine learning model when in the first state, and wherein the autonomous vehicle is configured to use the second machine learning model instead of the first machine learning model when in the second state;
   detecting, subsequent to detecting the transition signal, that a precondition for generating output by the second machine learning model is unsatisfied, wherein the precondition comprises a predefined number of frames of image data input to the second machine learning model; and
   delaying, until the precondition for generating output by the second machine learning model is satisfied, use of the second machine learning model instead of the first machine learning model by delaying a transition from the first state to the second state.

\* \* \* \* \*